Figure 1:
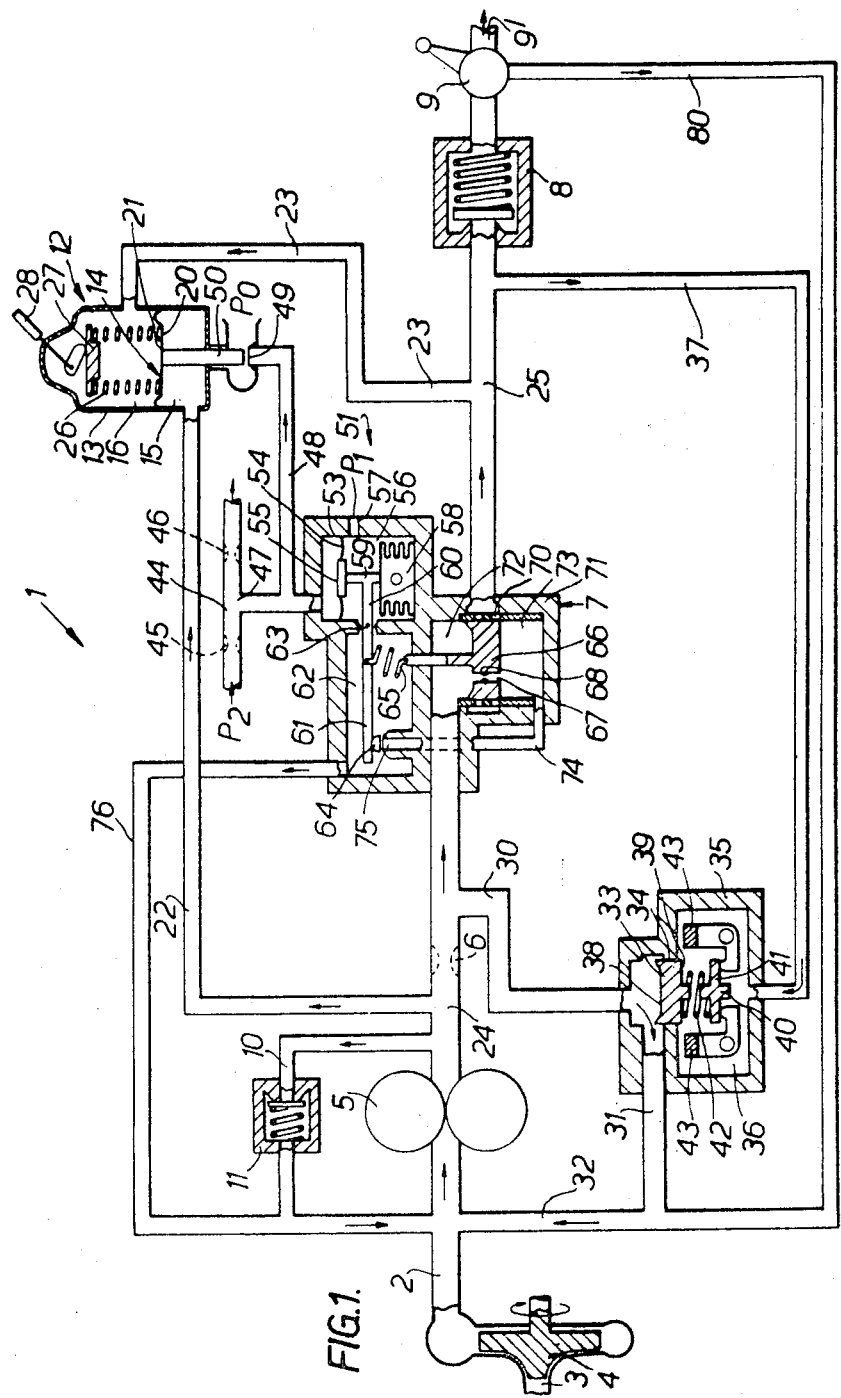

United States Patent [19]
Herbstritt

[11] 3,726,086
[45] Apr. 10, 1973

[54] ENGINE FUEL SUPPLY CONTROL SYSTEM

[75] Inventor: Karl Herbstritt, Chellaston, England

[73] Assignee: Rolls Royce Limited, Derby, England

[22] Filed: Apr. 9, 1971

[21] Appl. No.: 132,777

[52] U.S. Cl. ............................................60/39.28 R
[51] Int. Cl. ................................................F02c 9/04
[58] Field of Search ................................60/39.28 R

[56] References Cited

UNITED STATES PATENTS

| | | | |
|---|---|---|---|
| 3,427,804 | 2/1969 | Lawrence | 60/39.28 R |
| 3,514,946 | 6/1970 | Warne | 60/39.28 R |
| 3,327,759 | 6/1967 | Lewis | 60/39.28 R |
| 3,496,721 | 2/1970 | Lloyd | 60/39.28 |
| 3,131,750 | 5/1964 | Turner | 60/39.28 R |
| 3,475,908 | 11/1969 | Warne | 60/39.28 R |
| 3,557,552 | 1/1971 | Yates | 60/39.28 |
| 2,766,580 | 10/1956 | Buerer et al. | 60/39.28 R |

*Primary Examiner*—Carlton R. Croyle
*Assistant Examiner*—Robert E. Garrett
*Attorney*—Cushman, Darby & Cushman

[57] ABSTRACT

A gas turbine engine fuel control system comprising a main fuel conduit having a fuel pump, whose output is dependent upon engine speed, and a fuel metering device. A governor is provided which has a pressure-responsive member oppositely disposed pressure surfaces of which are open to the pressures prevailing in the main fuel conduit upstream and downstream of the fuel meter device. A control system is responsive to the position of the pressure-responsive member and controls the fuel supply passing to the downstream end of the main fuel conduit so as to maintain the engine speed at a predetermined value. A flow restrictor is provided in the main fuel conduit upstream of the fuel metering device, and downstream of the flow restrictor and upstream of the fuel metering device there is arranged a spill duct having means for varying the flow through the spill duct inversely with variations in the fuel density.

8 Claims, 4 Drawing Figures

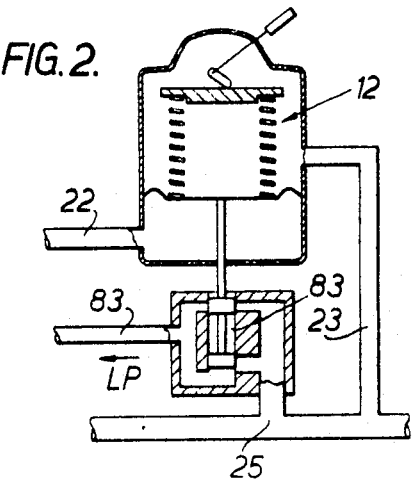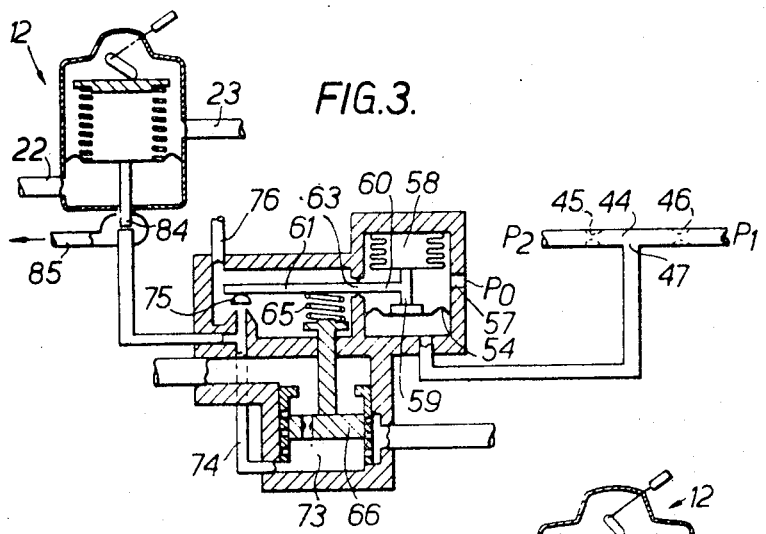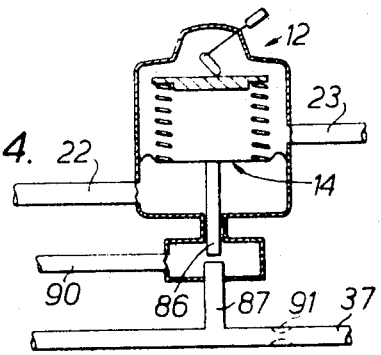

ENGINE FUEL SUPPLY CONTROL SYSTEM

This invention concerns an engine fuel supply control system and, although the invention is not so restricted, it is more particularly concerned with a gas turbine engine fuel supply control system.

Although the invention is primarily directed to any novel integer or step, or combination of integers or steps, as herein disclosed and/or as shown in the accompanying drawings, nevertheless according to one particular aspect of the present invention, to which, however, the invention is in no way restricted, there is provided an engine fuel supply control system comprising a main fuel conduit in which there are arranged in flow series a fuel pump, which is adapted to be driven by the engine so that its output is functionally dependent upon engine rotational speed, and a fuel metering device, a governor having a pressure responsive member oppositely disposed pressure surfaces of which are respectively open, by way of first and second passages, to the pressures prevailing in upstream and downstream portions of the main fuel conduit disposed respectively upstream and downstream of the fuel metering device, the said first passage communicating with the main fuel conduit downstream of the fuel pump; control means which are responsive to the position of the pressure responsive member and which control the fuel supply passing to the downstream end of the main fuel conduit so as, in operation, to maintain the engine rotational speed substantially at a predetermined value; a flow restrictor in the main fuel conduit downstream of the first passage and upstream of the fuel metering device, a spill duct communicating with the main fuel conduit downstream of the flow restrictor and upstream of the fuel metering device, and means for varying the flow through the spill duct inversely with variations in the fuel density.

The means for varying the flow through the spill duct may comprise an axially movable flow control valve which controls flow through the spill duct and which is axially positioned by a rotatable and axially movable member, the rotatable member being mounted in a chamber arranged to receive the fuel and being arranged to be driven by the engine, and the rotatable member being provided with fly weights which in operation are rotated through the fuel in the chamber and which position the rotatable member axially. Moreover, a spring may be interposed between the flow control valve and the rotatable member, means being provided for urging the flow control valve towards the rotatable member by applying to opposite sides of the flow control valve the pressures prevailing in the main fuel conduit immediately upstream and downstream of the fuel metering device.

The fuel metering device may have a valve member which is axially slidable within a chamber which is divided by the valve member into two spaces, one of said spaces receiving fuel directly from the main fuel conduit and the other space receiving fuel from the main fuel conduit by way of a restricted passage. Preferably, the said one space forms part of the main fuel conduit, the restricted passage extending through the valve member.

The said other space preferably communicates with an outlet port through which fuel in the said other space may pass to a low pressure area, flow through the outlet port being controlled by an outlet valve forming part of the said control means. Thus the control means may comprise a lever one arm of which carries the said outlet valve and is connected to the said valve member by way of a spring, the other arm of the lever being positioned by means controlled by the governor.

The said other arm may be positioned by a pressure responsive device the pressure applied to which is variable by the governor. Thus the governor may control a vent in a fluid conduit, the pressure in the fluid conduit being applied to the pressure responsive device.

The fluid conduit may communicate with a space between two restrictors disposed in a fluid duct, opposite ends of the fluid duct being respectively adapted to be supplied with fluid pressures functionally related to those prevailing at the intake and delivery ends of compressor means of a gas turbine engine.

Alternatively, the governor may control a spill flow of fuel passing from the said downstream portion to the inlet side of the fuel pump, or the governor may control a spill flow of fuel passing from the said other space to the inlet side of the fuel pump.

The governor could be a top speed governor, but is preferably a range speed governor, manually operable means being provided for applying an adjustable pressure to one of said oppositely disposed pressure surfaces, whereby to permit adjustment of the said predetermined value.

The invention also comprises a gas turbine engine provided with an engine fuel supply control system as set forth above.

The invention is illustrated, merely by way of example, in the accompanying diagrammatic drawings, in which:

FIG. 1 shows a gas turbine engine fuel supply control system in accordance with the present invention, and FIGS. 2 to 4 respectively illustrate modifications.

The terms such as "above" and "below," as used in this specification, are to be understood to refer to directions as seen in the drawings.

Referring first to FIG. 1, a gas turbine engine fuel supply control system 1 is provided with a main fuel conduit 2 which receives fuel which is pumped thereto, from a conduit 3, by means of an engine driven centrifugal backing pump 4. The main fuel conduit 2 has arranged therein in flow series a fuel pump 5 which is constituted by a constant displacement high pressure gear pump, a flow restrictor 6, fuel metering device 7, a pressurizing valve 8, a shut-off cock 9, the fuel passing through the downstream end 9' of the main fuel conduit 2 passing to the engine burners (not shown). The fuel pump 5 is driven by the gas turbine engine (not shown) so that the flow output of the fuel pump 5 is functionally dependent upon the engine rotational speed.

The inlet and discharge sides of the fuel pump 5 are interconnected by a by-pass passage 10 in which is connected a (normally inoperative) non-return valve 11 to permit fuel to flow from the discharge to the inlet side of the fuel pump 5 when the pressure on the discharge side exceeds a predetermined value.

A range speed governor 12, for maintaining the engine rotational speed at one of a number of selected predetermined values, comprises a housing 13 which is divided by a pressure responsive diaphragm 14 into chambers 15,16 which are respectively provided below and above the diaphragm 14.

The diaphragm 14 has lower and upper oppositely disposed pressure surfaces 20, 21 which are respectively open, by way of passages 22, 23, to the pressures prevailing in upstream and downstream portions 24, 25 respectively of the main fuel conduit 2. The portions 24, 25 are disposed respectively immediately upstream of the flow restrictor 6 (and hence upstream of the fuel metering device 7), and immediately upstream of the pressurizing valve 8 (and hence downstream of the fuel metering device 7). The passages 22, 23 respectively communicate with the chambers 15, 16, the passage 22 communicating with the main fuel conduit 2 downstream of the fuel pump 5 and thus immediately upstream of the flow restrictor 6.

The upper and lower ends of a coil spring 26 respectively engage a spring plate 27 and the pressure surface 21 of the diaphragm 14, the position of the spring plate 27 being adjustable by a manually operable pilot's throttle lever 28. Thus the pressure applied by the spring 26 to the pressure surface 21 may be adjusted by appropriate adjustment of the pilot's throttle lever 28, such adjustment varying the predetermined value to which the engine rotational speed is governed.

A spill duct has successive portions 30, 31, 32. The portion 30 communicates with the main fuel conduit 2 immediately downstream of the flow restrictor 6, while the portion 32 communicates with the main fuel conduit 2 on the inlet side of the fuel pump 5.

Communication between the portions 30, 31 is controlled by a flow control valve 33 which thus controls flow through the spill duct(and consequently controls the flow to the engine burners). The flow control valve 33 is axially slidable in an opening 34 in the wall of a chamber 35. The interior 36 of the chamber 35 receives fuel from the downstream portion 25 by way of a pipe 37. Opposite sides 38, 39 of the flow control valve 33 are thus subjected to the pressures prevailing in the main fuel conduit 2 immediately upstream and downstream of the fuel metering device 7, the difference between these pressures urging the flow control valve 33 towards a centrifugal governor 40 mounted in the chamber 35.

The centrifugal governor 40, which is driven by the engine, comprises a rotatable and axially movable spring plate 41, between which and the flow control valve 33 there is interposed a spring 42, and low density metal flyweights 43.

The flow control valve 33 is thus axially positioned by the centrifugal governor 40, and since, in operation, the flyweights 43 are rotated through the fuel in the chamber 35, the axial position of the flow control valve 33, and hence the flow through the spill duct, varies with the fuel density at any given position of the diaphragm 14.

A fluid duct 44, having restrictors 45, 46 thereof between which there is a space 47, is arranged to be connected, upstream of the restrictor 45, to a source of air at a pressure functionally related the the pressure $P_2$ prevailing at the delivery end of the engine compressor (not shown). The fluid duct 44 is also connected, downstream of the restrictor 46, to air at a pressure functionally related to the pressure $P_1$ prevailing at the intake of the compressor. The pressure in the space 47 will therefore be at a value $P_x$ which is intermediate the pressures $P_1$, $P_2$.

A fluid conduit 48, which communicates at its upstream end with the space 47, has a vent 49 at its downstream end to atmospheric pressure $P_o$, or to a pressure functionally related thereto. The flow through the vent 49, and thus the pressure in the fluid conduit 48, is controlled by a valve rod 50 which extends from the pressure surface 20 of the diaphragm 14. It will therefore be appreciated that any change in the relative pressures in the chambers 15, 16 will vary the position of the valve rod 50 and will therefore vary the size of the vent 49, whereby to vary the value of the pressure $P_x$.

When the pilot moves the pilot's throttle lever 28 to select a higher engine rotational speed, the vent 49 is normally closed. The value of the pressure $P_x$ is then dependent only upon the values of the pressures $P_1$, $P_2$.

The fuel metering device 7 is controlled by a control device 51. The latter has a bellows chamber 53 therein which is divided by a pressure responsive diaphragm 54 into a space 55 above the diaphragm and a space 56 below it. The space 55, and thus the upper surface of the diaphragm 54, is open to the pressure $P_x$, while the space 56, and thus the lower surface of the diaphragm 54, is open via an aperture 57 to the pressure $P_1$.

Mounted in the space 56 is an evacuated bellows 58 which is interconnected with the diaphragm 54 by way of a rod 59. The rod 59 is connected to an arm 60 of a lever which has an arm 61 disposed within a fuel chamber 62, the lever 60, 61 being mounted on a fulcrum 63 which forms a seal between the space 56 and the fuel chamber 62. The diaphragm 54 thus positions the arm 60. The arm 61 of the lever 60, 61 carries a half-ball outlet valve 64. The arm 61 is also connected, by way of a spring 65, to a valve member 66 of the fuel metering device 7. The valve member 66, which has a passage 67 there through provided with a restrictor 68, controls flow through metering orifices 70 in the wall of a chamber 71 within which the valve member 66 is axially slidable.

The chamber 71 is divided by the valve member 66 into spaces 72, 73, the space 72 forming part of, and thus receiving fuel directly from, the main fuel conduit 2. The space 73, however, receives fuel from the main fuel conduit 2 by way of the passage 67. The valve member 66 is urged towards a position in which the forces exerted thereon, from the pressures prevailing in the spaces 72, 73, are balanced.

The space 73, moreover, communicates with one end of a spill passage 74 whose other end communicates, at an outlet port 75, with the fuel chamber 62. Flow through the outlet port 75 is controlled by the half-ball outlet valve 64. Fuel from the space 73 may thus pass through the outlet port 75 into the fuel chamber 62, whence it will flow, by way of a spill line 76, to the low pressure area constituted by the inlet side of the fuel pump 5.

Accordingly, the lever 60, 61 serves to balance the force of the spring 65 (which force is proportional to the displacement of the valve member 66 from a datum position) against the force imparted by the diaphragm 54 and bellows 58. If these forces are out of balance, the lever 60, 61 will move so as to open or close the outlet port 75 and hence adjust the pressure in the space 73 to a value at which the forces will be balanced. This in turn will cause the valve member 66 to move position. The position of the valve member 66, during acceleration is governed by the value of the pressure $P_x$, which in this case is dependent only on the pressures $P_1$ and $P_2$, while the position of the valve member 66 at steady speed is governed by the pressure $P_x$ as adjusted by the range speed governor 12.

The shut-off cock 9 may be placed in one of two positions, in one of which fuel may pass to the engine burners, and in the other of which fuel may pass by way of a conduit 80 to the inlet side of the fuel pump 5.

In operation, if the density of the fuel increases, while other variables remain constant, the pressure drop across the flow restrictor 6 will rise. The flyweights 43 will, moreover, move radially inwardly, whereby the flow control valve 33 will permit a larger flow through the spill duct 30, 31, 32.

The flow control valve 33 remains in an equilibrium position only when the pressure drop across the fuel metering device 7 is equal to the centrifugal force of the flyweights 43 divided by the fixed area of the flow control valve 33. The mass flow through the fuel metering device 7 is equal to its flow area times the square root of the pressure drop across it times the square root of the density of the fuel times a constant. However, by making the flyweights 43 of appropriate low density, it can be shown that the pressure drop at the flow control valve 33, will be made very nearly inversely proportional to density.

During acceleration of the engine with the engine speed rising, the position of the valve member 66, and consequently the flow area of the fuel metering device 7, is dependent only upon the value of the pressures $P_2$ and $P_1$, since the vent 49 will be closed and the pressure drop across the flow restrictor 6 is of no importance. Consequently the mass flow of fuel passing to the burners will be substantially independent of density, or, if so desired, can vary with density in a manner preferred by suitably choosing the density of the flyweights 43. The flow will then only be dependent upon engine rotational speed and upon the values of the pressures $P_2$ and $P_1$.

During deceleration of the engine, the position of the valve member 66, and consequently the flow area of the fuel metering device 7, is again dependent upon the values of the pressures $P_2$ and $P_1$, since the vent 49 will have opened to its maximum fixed opening.

The mass flow of fuel passing to the burners will, during deceleration thus vary with density in a manner as described above in relation to the acceleration of the engine.

Towards the end of acceleration (or deceleration) as the engine approaches the engine speed selected by the pilot, the vent 49 must be progressively opened (or closed) to reduce the acceleration (or deceleration) and bring the engine to a steady speed by trimming the value of the pressure $P_x$. The speed at which the vent opens must be dependent only upon the setting of the pilot's throttle lever 28. Consequently the pressure drop across the range speed governor 12 must be a function of the engine rotational speed $N$ but independent of fuel density. If the flow restrictor 6 has a specific area, the increase in pressure drop across it at a given engine speed can be arranged to rise with increase in fuel density just sufficiently to balance the corresponding fall in pressure drop across the valve member 66 as set by the flow control valve 33, the flyweights 43, and the increase in density, so that the total pressure differenced across the diaphragm 14 does not change with changes in density.

Expressed mathematically, it can be shown that $$\Delta P_{FMD} = K_1 N^2 (\rho_F - \rho_f) \qquad 1$$

Where
- $\Delta P_{FMD}$ = The pressure drop across the fuel metering device 7
- $K_1$ = A constant whose value depends only on the particular flyweights 43 and flow control valve 33 employed
- $\rho_F$ = The density of the flyweights 33
- $\rho_f$ = Density of the fuel in which the flyweights 33e are immersed
- $N$ = Engine rotational speed The value of $\rho_F$ is ideally chosen so that during engine acceleration the mass flow through the fuel metering device 7 is independent of fuel density, and it can be shown that for this to occur $\rho_F = \rho_f$ Consequently the density of the flyweights 33 can be chosen to be approximately equal to twice the density of the average fuel employed.

To provide satisfactory range speed governing, the pressure drop across the range speed governor 12 must be a function of $N$ but independent of fuel density $\rho_f$. A flow restrictor 6 of specific flow area must be added in series with the pressure drop across the fuel metering device in order to cancel out the effect of fuel density. Thus:

$$\Delta P_{FMD} = K_1 N^2 / (\rho_F - \rho_f)$$
$$\Delta P_{Rest} = K_2 N^2 \rho f \qquad 2$$

where $K_2$ is dependent on the size of the flow restrictor 6 and on the capacity of the fuel pump 5, and $\Delta P_{Rest.}$ = the pressure drop across the flow restrictor 6.

$$\Delta P_{Gov} = \Delta P_{FMD} + \Delta P_{Rest}$$
$$= N^2 [K_1 (\rho_F - \rho_f) + K_2 \rho_f] \qquad 3$$

where $\Delta P_{Gov}$ = the pressure drop across the range speed governor 12

For constant $\Delta P_{Gov}$ irrespective of variations in the value of $\rho_f \gamma P_{Gov}/\gamma \rho_f = 0 = N^2 [(-1)K_1 + K_2]$
i.e., $K_1 = K_2$ \qquad 4

Thus from equation (4), the slze of the flow restrictor 6 for a given fuel metering device 7 and a given fuel pump 5 may be calculated.

If, for any given setting of the governor 12, the engine rotational speed increases (or reduces), other variables being constant, the pressure drops across the flow restrictor 6 and the fuel metering device 7 will each rise (or fall) and the diaphragm 14 will therefore cause the valve rod 50 to increase (or reduce) flow through the vent 49. The pressure $P_x$ will therefore fall (or rise), causing the arm 61 to pivot downwardly (or upwardly). This will cause the valve member 66 to move to a more closed (or open) position. The consequent reduced (or increased) fuel flow to the burners will ultimately restore the engine rotational speed to the predetermined value.

Similarly changes in the pressure ratio $P_2/P_1$ will adjust the position of the valve member 66 and hence the fuel flow to the burners.

In FIGS. 2 – 4 there are illustrated portions of modified gas turbine engine fuel control supply systems which are generally similar to that of FIG. 1 and which, for this reason, will not be described in detail, like parts being indicated by like reference numbers.

In the FIG. 2 construction, the range speed governor 12, instead of controlling the value of the pressure $P_x$, controls the position of a spill valve 92. The spill valve 82 controls a spill flow from the downstream portion 25 to a spill conduit 83 whose downstream end communicates with the inlet, or low pressure, side of the fuel pump 5.

In the FIG. 3 construction, the range speed governor 12, instead of controlling the value of the pressure $P_x$, controls the position of the valVe member 84. The valve membeR 84 controls a spill flow from the spill passage 74 (and thus from the space 73) to a bleed passage 85 whose downstream end communicates with the inlet, on low pressure, side of the fuel pump 5.

In the FIG. 4 construction, the range speed governor 12, instead of controlling the value of the pressure $P_x$, controls the position of a valve member 86. The valve member 86 controls a spill flow from a passage 87 to a spill passage 90 which communicates with the spill duct portion 32 and hence with the inlet or low pressure side of the fuel pump 5. The passage 87 communicates with the pipe 37 immediately downstream of a fixed restrictor 91 thereIn, and thus receives a spill flow of fuel from the downstream portion 25.

I claim:

1. An engine fuel supply system comprising
a main fuel conduit having a fuel pump driven by the engine whereby the output of said pump is functionally dependent upon the engine's rotational speed, said main fuel conduit having a fuel metering device disposed downstream of said fuel pump, a flow restrictor located in said main fuel conduit between said fuel pump and said metering device, a governor having a pressure responsive member including oppositely disposed pressure surfaces, a first passage communicating with one of said pressure surfaces and said main conduit at a point located upstream of said restrictor and downstream of said fuel pump, a second passage communicating with the other of said pressure surfaces and said main conduit at a point downstream of said metering device, control means responsive to the position of said pressure responsive member to control the fuel supply passing to the downstream end of the main fuel conduit, a spill duct communicating with the main fuel conduit downstream of said flow restrictor and upstream of said fuel metering device and means for varying the flow through the spill duct inversely with variations in the fuel density,
said fuel metering device comprising a valve member disposed in a chamber and axially slidable therein, said chamber being divided by said valve member into two spaces, one of said spaces being in direct communication with said main fuel conduit, said valve member having a restricted flow passage for delivering fuel from said one space to the other of said spaces, said other of said spaces having an outlet port which communicates through an outlet valve with a low pressure area, said control means including a lever having one arm operatively connected to said outlet valve and connected to said valve member by way of a spring, said lever having a second arm, means controlled by said governor for positioning said second arm.

2. An engine fuel supply control system as claimed in claim 1 wherein the means for varying the flow through the spill duct comprises an axially movable flow control valve which controls flow through the spill duct and which is axially positioned by a rotatable and axially movable member, the rotatable member being mounted in a chamber for receiving the fuel and being driven by the engine, and the rotatable member being provided with flyweights which in operation are rotated through the fuel in the chamber and which position the rotatable member axially.

3. An engine fuel supply control system as claimed in claim 2 wherein a spring is interposed between the flow control valve and the rotatable member, means being provided for urging the flow control valve towards the rotatable member by applying to opposite sides of the flow control valve the pressures prevailing in the main fuel conduit immediately upstream and downstream of the fuel metering device.

4. An engine fuel supplY control system as claimed in claim 1 wherein the governor is a range speed governor, normally operable means being provided for applying an adjustable pressure to one of said oppositely disposed pressure surfaces.

5. An engine fuel supply control system as claimed in claim 1 wherein said fuel metering device includes a pressure responsive device operatively connected to said secOnd arm, and said governor having means for regulating the pressure applied to said pressure responsive device.

6. An engine fuel supply control system as claimed in claim 5 wherein said regulating means includes a fluid conduit having a vent and said governor having means for opening and closing said vent.

7. An engine fuel supply control system as claimed in claim 6 wherein said engine is a gas turbine engine having compressor means and said fluid conduit communicates with a space between two restrictions disposed in a fluid duct, opposite ends of said fluid duct being respectively supplied with fluid pressures functionally related to those prevailing at the intake and delivery ends of said compressor means.

8. An engine fuel supply control system as claimed in claim 7 wherein said outlet port in said other of said spaces of said chamber communicates through said outlet valve with the inlet side of said fuel pump.

* * * * *